United States Patent [19]

Sauer et al.

[11] 4,233,939
[45] Nov. 18, 1980

[54] POULTRY CAGE FEEDING SYSTEM

[75] Inventors: Walter Sauer, Aschaffenburg; Berthold Gerhart, Mömbris, both of Fed. Rep. of Germany

[73] Assignee: Hans Giesbert Kommanditgesellschaft, Mombris, Fed. Rep. of Germany

[21] Appl. No.: 23,054

[22] Filed: Mar. 22, 1979

[30] Foreign Application Priority Data

Jan. 8, 1979 [DE] Fed. Rep. of Germany ....... 2739747

[51] Int. Cl.³ .................... A01K 39/00; A01K 39/014
[52] U.S. Cl. .................................. 119/18; 119/52 AF
[58] Field of Search ............... 119/18, 51 CF, 52 AF, 119/61

[56] References Cited

U.S. PATENT DOCUMENTS

| | | | |
|---|---|---|---|
| 3,199,493 | 8/1965 | Hart | 119/52 AF |
| 3,543,283 | 11/1970 | Cataline | 119/61 |
| 3,738,324 | 6/1973 | Keen et al. | 119/18 |
| 3,962,996 | 6/1976 | Jones et al. | 119/61 X |

Primary Examiner—Hugh R. Chamblee
Attorney, Agent, or Firm—Gajarsa, Liss & Conroy

[57] ABSTRACT

A cage battery e.g. for chickens wherein the feeding assembly extending in front of the cage row consists of a feed conveying trough containing a conveyor element and a separate feed trough extending parallel with the conveying trough and recessed into the bottom of the cages.

4 Claims, 2 Drawing Figures

POULTRY CAGE FEEDING SYSTEM

The invention relates to a cage type battery for small animals, particularly for rearing chickens, consisting of a plurality of cage rows to the front of which feeding troughs are attached in which feed is distributed along the cages by means of a conveyor device.

For the purpose of chicken breeding cage batteries are used which consist of rows of cages arranged in a common frame. The individual rows of cages may be more than 50 meters long. Along these rows of cages there are feeding troughs provided from which the chicken can take out the chicken feed. The distribution of the feed in the feeding troughs is effected by means of conveying installations located in the feeding troughs.

It is known that for the purpose of feed distribution screw-conveyors or conveyor chains are fitted into the feeding troughs. The screw-conveyors can be operated by a motor in such a way that the feed is distributed along the cages. The transportation of the feed can also be effected by chains fitted into the feeding troughs that are pulled through the feeding trough for this purpose or by a feeder car moving along the cages inside the feeding troughs.

In these known specific constructional embodiments of feeding troughs, the animals to be fed may touch moving parts such as the screw, chain or in some cases other transporting means and there is a danger, therefore, that the animals could thus injure themselves. With this construction it kept happening that the animals were injured by the transport devices.

In addition, the level of the feed fluctuates in the feeding trough, so that sometimes the animals could not take out feed from the feeding trough because the distance between the feed and a grid placed over the feed was too great. In known constructions, the feeding trough, the cage doors or both have to be repeatedly readjusted during the rearing period according to the growth of the animals.

One particularly significant drawback of the known constructions of feeding troughs is that the animals placed at the end of the feeding trough receive feed that has already been touched by other animals. In this way morbific agents can be transferred through the feed from animals of one cage to animals in other cages.

The underlying aim of the invention is to eliminate the above-mentioned disadvantages and to provide for small animals in cage-type batteries, an extensively automated feed supply which is hygienic and precludes injuries to the animals when feeding. On one hand, the animals should be able easily to reach the feed while on the other hand wastage of feed by the animals ought to be prevented.

According to the invention this problem is solved in a cage battery of the above-described kind in that the feeding trough consists of a conveyor trough and a feed trough running parallel to the conveyor trough. The level of food in the conveyor trough is usually slightly higher than in the feed trough and the food is supplied while being conveyed via a slope into the parallel running feeder trough. The conveying installation may consist of a screw conveyor fitted in the conveyor trough. The feed and conveyor troughs are so arranged that the animals can have access only to the feed trough. The food in the feed trough is not displaced along the cages so that at all times the same animals only can touch a certain portion of food in the feed trough. Because the animals are not in contact with the feed trough, the occurrence of injuries and, to a large extent, the transfer of morbific agents via the feed to the animals in subsequent cages is precluded. A repeated adjustment of the cage doors or of the feeding trough during the period of breeding is not necessary.

It is particularly advantageous to use for the distribution of feed a feeder car that can be shifted along the feeder trough. Feed is periodically supplied into the feeder trough by a slanted feed pusher provided on the feeder car. In this way it is ensured that the animals always obtain fresh feed.

The feeder trough consisting of a feed trough and a conveyor trough can be produced in a simple way in one piece as an integrated part e.g. of a 1 mm thick sheet metal. The food in the feed-trough can be separated from the food in the conveyor trough by an interposed elevation formed by a slope falling towards the feed trough in such a way that the food is prevented from sliding back from the feed trough into the conveyor trough.

A favourable arrangement of the feeding trough consisting of a conveyor trough and a feed trough results from the provision of a recess into the bottom of the cage, with the conveyor trough running outside the cage. Consequently, the feed trough is freely accessible for the animals in the cages, it requires no additional floor space and the conveyor trough running outside the cages is well separated from the animals. In order to avoid wastage of food in the feed trough, by the animals, it is advantageous to fit a cover grid over the feed trough thus preventing the animals to scratch about in the food. A loop can be bent at one end of the cover grid by means of which the cover grid is suspended over a dividing wall arranged between the feed trough and the bottom of the cage. The partition consists of an elevated extension formed by the closure of the feed trough and needs to project by only approximately 3 to 6 cm over the bottom of the cage. The height of the partition is so dimensioned that the wastage of feed in the direction towards the interior of the cage is thoroughly prevented.

In order to ensure that the chickens can reach the feed trough, over this partition, longitudinal wires are fastened to the loop formed by the cover grid, which serve as rungs for the chickens to climb over the partition.

In a further development of the invention, there is a vertical separating element between conveyor trough and feed trough which has only a small slot for the free supply of food to the feed trough. This partitioning element serves, on one hand, for the separation of the food in the conveyor trough from the food in the feed trough, leaving only the required slot free through which the food can be displaced from the conveyor trough into the feed trough. On the other hand, this separating element is bent over at its upper end in such a way that the cage doors fitted to the front of the cages can be engaged in spring-loaded hooks fitted to the separating element.

The stability of the feeding trough consisting of a conveyor trough and a feed trough can be enhanced by applying supports mutually spaced at a certain distance and serving for the base of the feeding trough.

The invention is described by way of example in the accompanying drawings, wherein.

Figure 1:
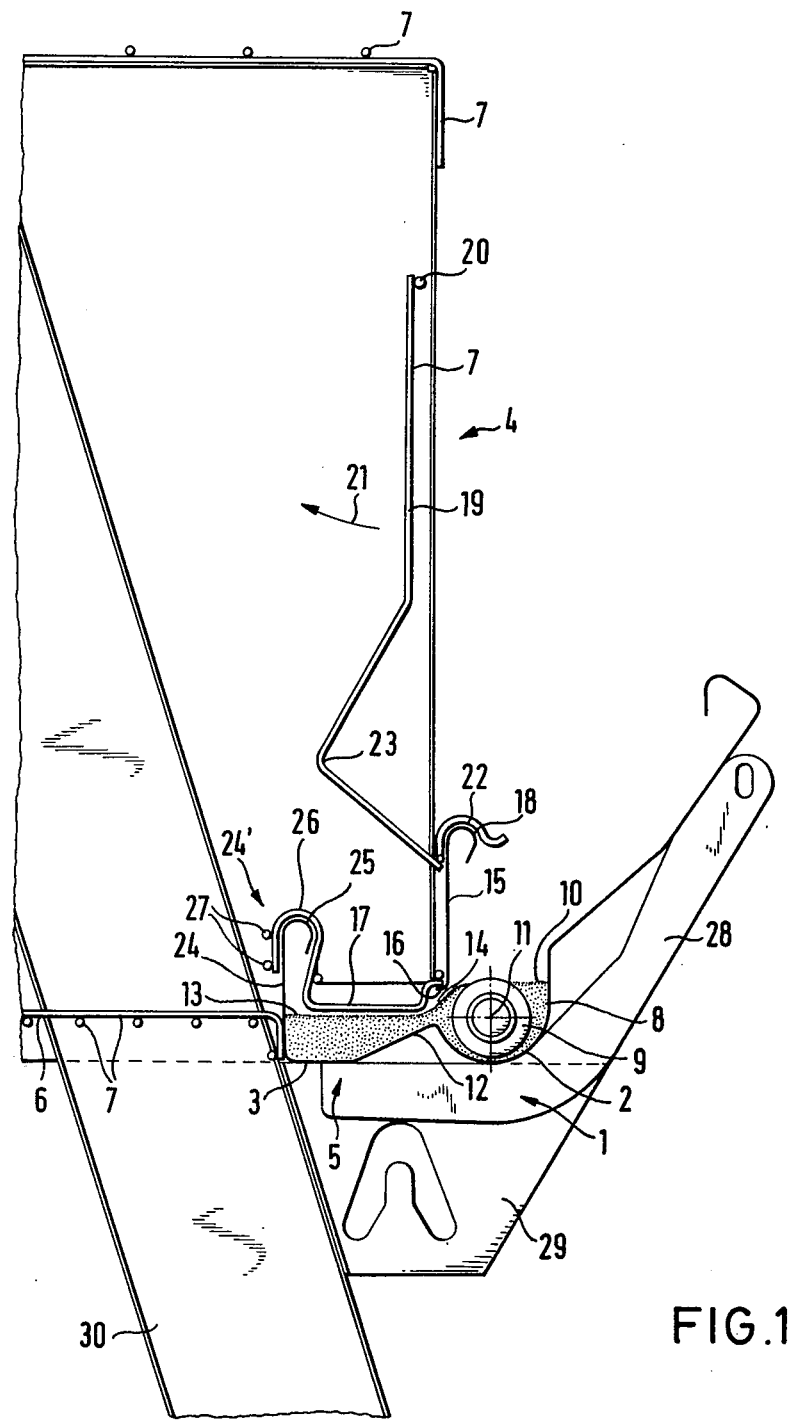
FIG. 1 is a side view of a cage with a feeding trough.

The feeding trough 1 illustrated in FIG. 1 consists of a conveyor trough 2 and a feed trough 3 made as one piece from sheet metal with a wall-thickness of about 0.5 to 1 mm. The feeding trough 1 is fixed at the front area of the cage 4 in such a way that the feed trough 3 is inserted into a recess 5 in the bottom 6 of the cage 4. The conveyor trough 2 runs outside the cage 4 and cannot be reached by the animals. The bottom 6 as well as the other parts of the cage 4 are made in a known manner from round wire 7.

A screw-conveyor 9 can be fitted into the conveyor trough 2 for transporting feed 8; when the screw is set in motion, it effects transportation of the feed 8. The level of the feed 10 is preferably set in the conveyor trough 2 so that the screw conveyor 9 is just covered over. In conveying the feed 8 in the direction of the central axis 11 of the screw conveyor 9 a portion of the feed 8 is forwarded over a slope 12 serving as a barrier into the feed trough 3 until the position 13 of the feed reaches a level where further filling up of the feed trough 3 is prevented. The level 13 of feed in the feed trough 3 is generally lower than in the conveyor trough 2. Depending on whether a faster or slower replenishment of the feed 8 into the feed trough 3 is required, a gap 14 between conveyor trough 2 and feed trough 3 can be selected to be larger or smaller accordingly. This can be achieved either by pulling a partition such as separating element 15 further downwardly or by inclining the slope 12 from a more elevated point.

As illustrated, the separating element 15 may be a vertical sheet metal piece. The lower end of which is bent in an angle 16 serving as a base for a cover-grid 17 arranged over the feed trough 3. The upper edge 18 of the separating element 15 is bent over and serves as a detent for the cage door 19. The cage door 19 is fastened to a piece 20 of round wire which journals the cage door 19 for pivoting in the direction of arrow 21. A spring hook 22 fastened to the cage door 19 resiliently engages the lip 18 of the separating element 15 and keeps the cage door 19 securely closed. An angle member 23 bent over the cage door 19 makes a spring-loaded engagement of the hook possible and prevents older animals from being in the feed trough 3.

At one end of the feed trough 3 there is a vertical extension 24 forming a partition 24' of reduced height between the feed trough 3, and the bottom 6 of the cage 4. The extension 24 is bent over at its upper end 25. The cover grid 17 is on the one hand seated on an angled lug 16 bent over the separating element 15, and on the other hand it rests on the extension 24 by means of a loop 26 formed at its opposite end. In order to allow the animals e.g. chickens in the cage 4 to pass from the cage bottom 6 on to the cover grid 17 to reach the feed, longitudinal wires 27 are provided on the loop 26 that serve as ladder rungs for the animals when they surmount the partition 24'.

The partition 24' and also the separating element 15 prevent wastage of feed 8 by the animals. The cover grid 17 is also provided for this purpose: although it enables the animals to take out feed 8, it prevents wastage of feed 8 caused by scratching movements of the animals.

The feeding trough 1 can be fixed by seating it on supports 28 interspaced at a distance which can be connected via a sheet metal member 29 to the respective stands 30 between which cages 4 are supported.

Figure 2:
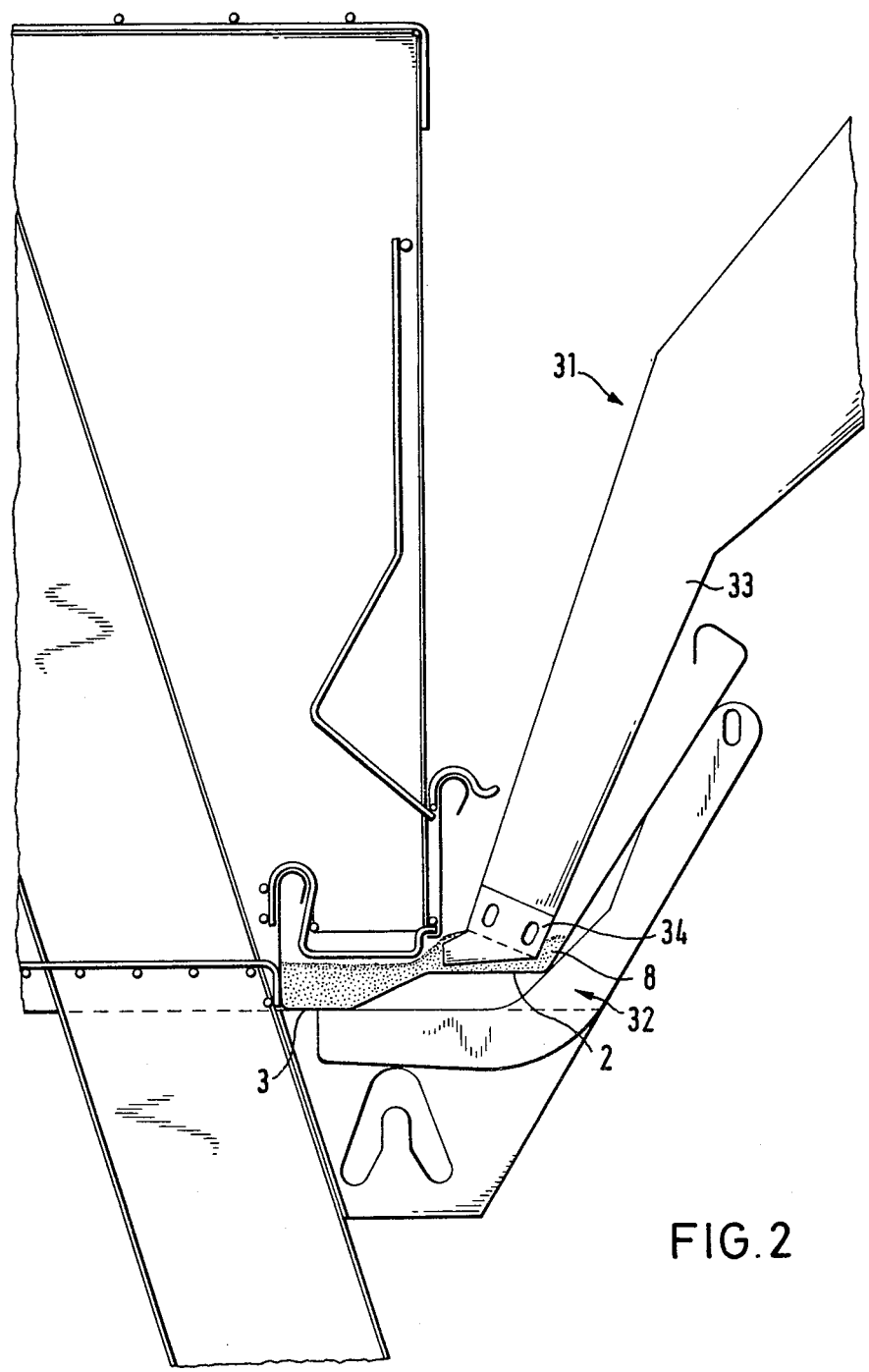
FIG. 2 is a side view of a cage with feeding trough and feeder car.

FIG. 2 differs from FIG. 1 only in the method of feed distribution. While the screw-conveyor 9 illustrated in FIG. 1 supplies simultaneously the whole feed trough 3 with the feed 8 in the conveyor trough 2, the feeder car 31 illustrated in FIG. 2 distributes the feed 8 in time-separated steps along the feed trough 3. For this purpose, the feed car 31 is displaced in the conveyor trough 2. The feed 8 is forwarded into the feed trough 3 by means of a feed pusher 34 fitted at the lower end 32 of the feed box 33.

We claim:

1. A feeding cage battery having at least one cage for small animals, particularly poultry, and a trough stationary relative to the cage, the trough comprising:
   a conveyor trough section removed from the cage and extending along a lower edge of the cage;
   a feed trough section located in a recess formed in the bottom of the cage;
   inclined barrier means extending between respective bottom portions of the conveyor and feed trough sections, for the length thereof, for permitting only unidirectional flow of feed from the conveyor trough section to the feed trough section; and
   partition means mounted between the relative top portions of the conveyor and feed trough sections for completing, with the barrier means to provide a small gap between the trough sections and said partition means sufficient for feed flow therebetween but insufficient for allowing access to the conveyor trough section by an animal.

2. A cage battery according to claim 1 wherein the partition means is a sheet metal member having a lip formed at its top edge, the lip serving as a locking element for a door in the cage.

3. The cage battery according to claim 2 together with a grid positioned within the trough for minimizing contact between an animal and feed.

4. The subject matter set forth in claim 3 together with means connected to the grid and serving as rungs for an animal to climb between a central portion of the cage and the bottom portion thereof which is disposed above the feeding trough section.

* * * * *